April 13, 1965 W. E. RANEY 3,177,569
TOOL
Filed April 24, 1963 4 Sheets-Sheet 1

INVENTOR.
WILLIAM E. RANEY
BY
Teare, Fetzer & Teare
ATTORNEYS

April 13, 1965 W. E. RANEY 3,177,569
TOOL
Filed April 24, 1963 4 Sheets-Sheet 2
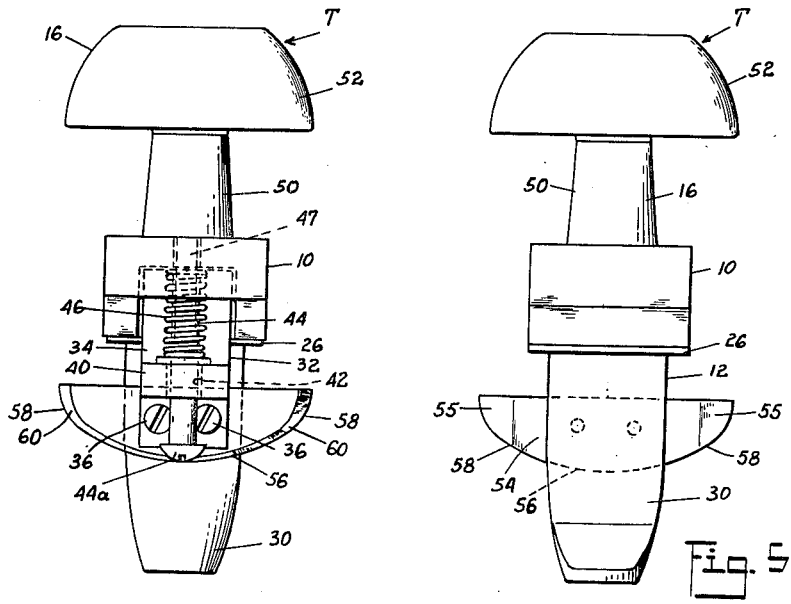
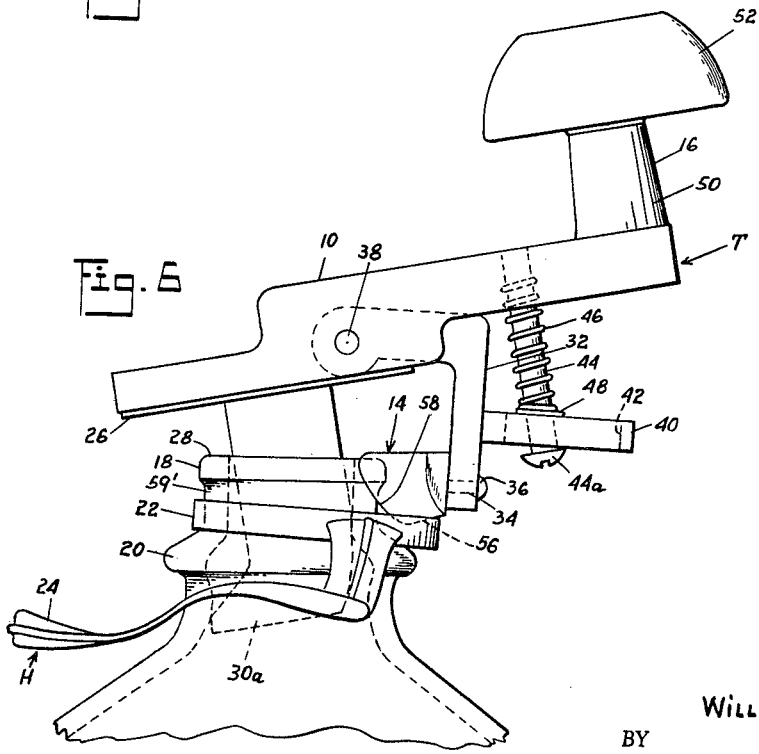
INVENTOR.
WILLIAM E. RANEY
BY
Teare, Telzer & Teare
ATTORNEYS

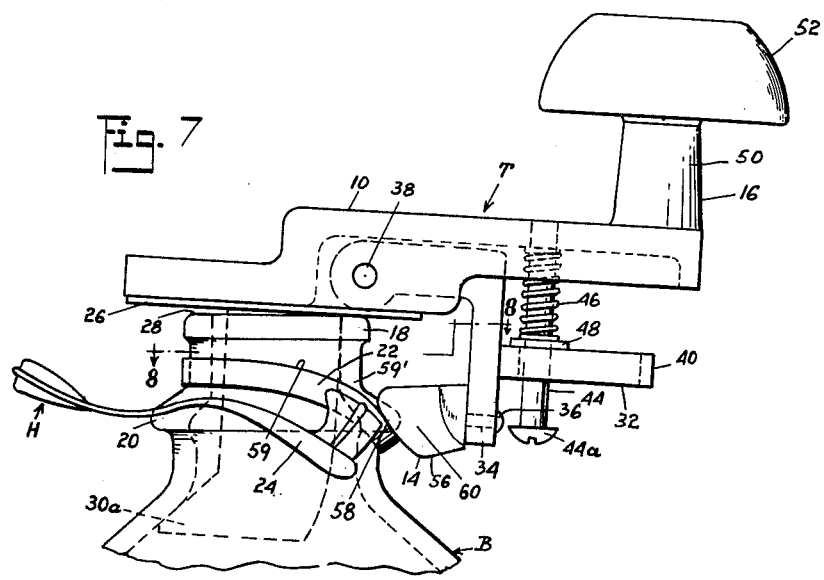
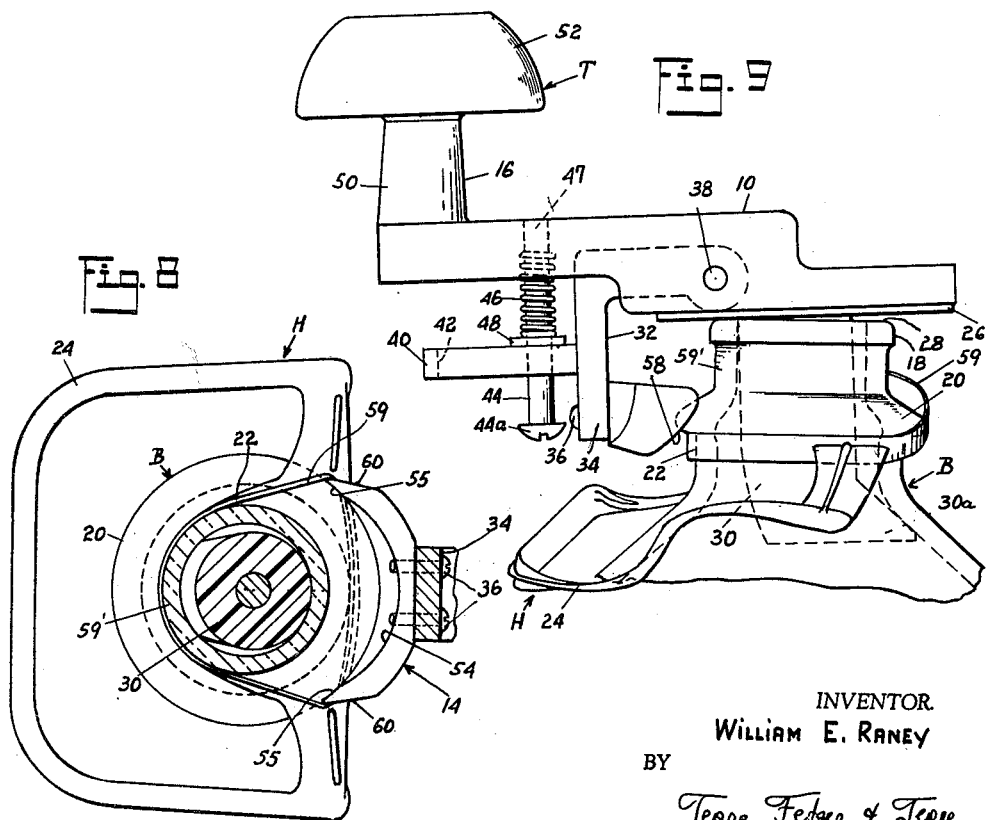

April 13, 1965 W. E. RANEY 3,177,569
TOOL
Filed April 24, 1963 4 Sheets-Sheet 4
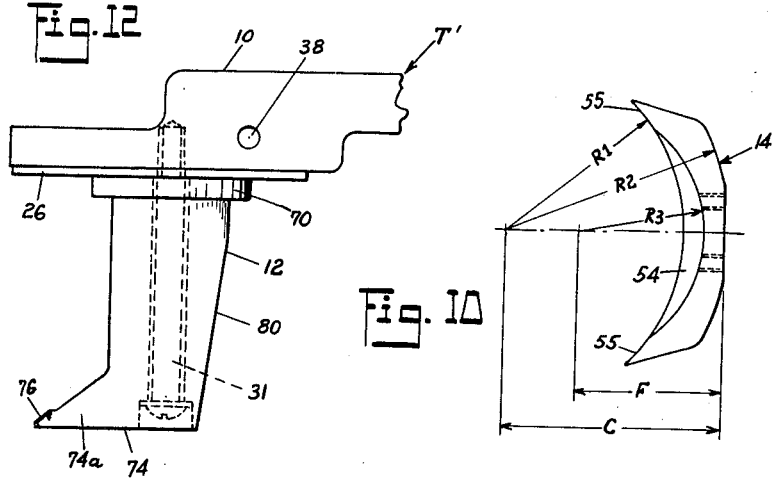
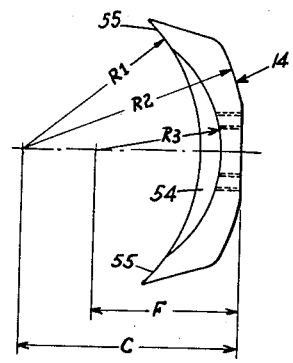
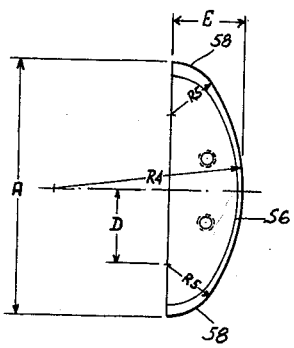
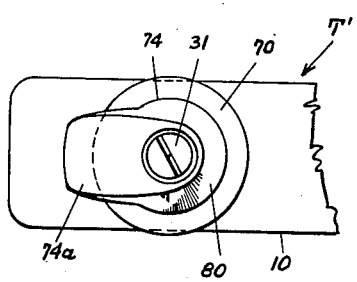
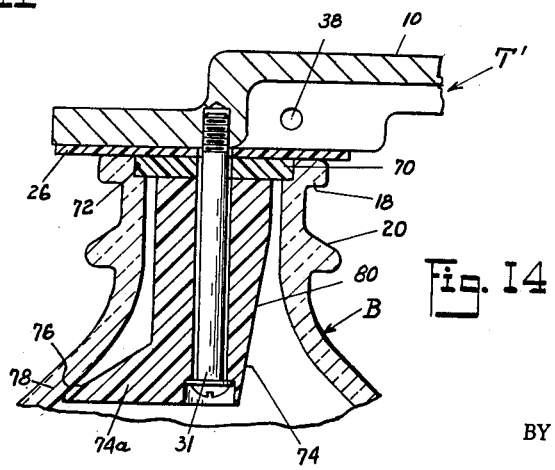
INVENTOR.
WILLIAM E. RANEY
BY
Teare, Tetju & Teare
ATTORNEYS United States Patent Office 3,177,569
Patented Apr. 13, 1965

3,177,569
TOOL
William E. Raney, Lakewood, Ohio, assignor to Sun Industries, Inc., Cleveland, Ohio, a corporation of Ohio
Filed Apr. 24, 1963, Ser. No. 275,442
11 Claims. (Cl. 29—235)

This invention relates in general to a tool for applying a band to a container, and more particularly to a manual tool for applying an elastomeric or plastic carrying handle to a container, such as a milk bottle.

The use of ring-like or band-like plastic or elastomeric carrying handles for containers, such as milk bottles, has become widely prevalent in recent times. The application of the plastic handle to each bottle has been of a somewhat time-consuming procedure, since the ring portion of the handle must be generally forced down over a bumper guard or enlargement, generally integrally formed on the neck of the bottle, and into holding coaction with the bumper guard, whereby the handle is then disposed in retained position on the neck of the bottle.

The present invention provides a novel tool for greatly facilitating the application of a band, such as an expansible band of elastomeric or platsic material, to a container.

Accordingly, an object of the invention is to provide a novel tool for applying a generally band-like object to a container.

A further object of the invention is to provide a novel, manually operated tool adapted for use with a necked container, for forcing an expansible band-like object, over an enlarged section of the neck of the container.

A still further object of the invention is to provide a novel, manual tool for applying a ring-like plastic or elastomeric carrying handle to the neck of a milk bottle having an enlargement thereon, with the tool comprising means adapted for reception in the neck of the bottle for rotatably mounting the tool on the bottle, cam shoe means engageable with the ring-like carrying handle for forcing such ring-like carrying handle down over the enlargement of the bottle, and means for rotating such tool and associated cam shoe means circumferentially about the ring-like portion of the carrying handle, for forcing the latter down over the enlargement of the bottle.

Other objects and advantages of the invention will be apparent from the following description taken in conjunction with the accompanying drawings wherein:

FIG. 4 is an end elevational view taken from the right hand end of FIG. 1;

FIG. 5 is an end elevational view taken from the left hand end of FIG. 1;

FIG. 6 is an elevational view of the tool as initially being applied to a milk bottle having an enlargement on the neck thereof, for forcing an associated band-like carrying handle down over such enlargement, for securing such handle to the bottle.

FIG. 7 is a side elevational view similar to that of FIG. 6 but showing the tool in final mounted condition on the neck of the bottle and in a position preparatory to rotation of the tool;

FIG. 8 is a sectional view taken generally along the plane of line 8—8 of FIG. 7 looking in the direction of the arrows;

FIG. 9 is an elevational view generally similar to FIGS. 6 and 7 but showing the tool rotated approximately 180° from the FIG. 7 position, and wherein the cam shoe thereon has forced a considerable portion of the band of the handle down underneath the enlargement or bumper on the neck of the container;

FIG. 10 is a top plan view of the shoe member per se, illustrating various dimensions thereof;

FIG. 11 is an elevational view taken from the right of FIG. 10;

FIG. 12 is a fragmentary, side elevational view of a modified form of tool;

FIG. 13 is a bottom plan view of the FIG. 12 arrangement;

FIG. 14 is a fragmentary section illustrating the tool of FIGS. 12 and 13 are mounted on the neck of a bottle.

Figure 1:
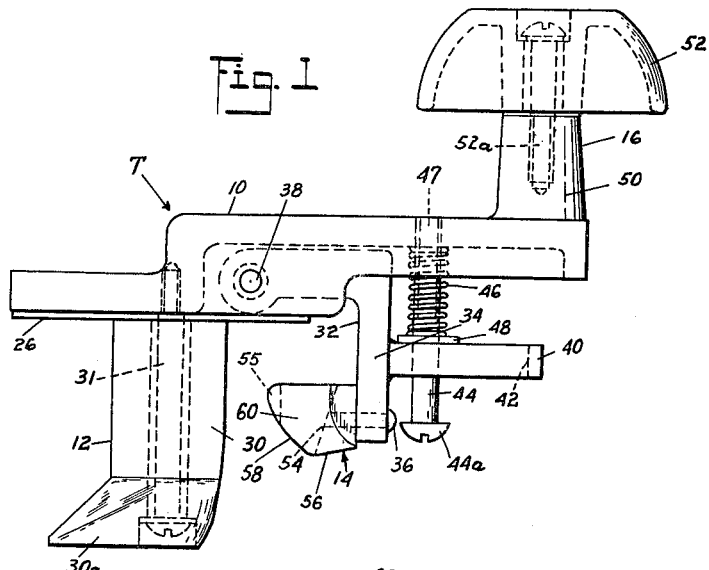
FIG. 1 is a side elevational view of the tool of the invention.

Referring now again to the drawings, the tool T may broadly comprise a body portion 10 having means (e.g. 12) thereon for mounting the tool on a container B, a cam means or shoe 14 disposed in spaced relation with respect to means 12, and means (e.g. 16) for rotating the tool.

The container or milk bottle B illustrated (FIG. 6) comprises a top, enlarged lip portion 18, and a lower bumper guard or enlargement 20. The carrying handle H for the bottle may be of the general type shown in United States Patent No. 3,000,527, issued September 19, 1961, to Webb C. Jennings et al. Such handle is conventionally formed of generally flexible plastic or elastomeric material, and includes a ring-like or band-like portion 22 adapted to be forced over the bottle enlargement 20, and a handle portion 24 projecting generally laterally from the ring portion. The flexible handle portion is adapted to be lifted upwardly above the top lip 18 of the bottle neck, for carrying purposes. The internal diameter of the ring portion 22 of the handle is preferably such that it readily slips over the lip 18 on the bottle neck, but will not readily pass the enlargement 20 on the bottle, and thus in order to secure the handle to the bottle, this ring-like portion 22 must be forced downwardly over the enlargement 20, whereupon it is disposed in secured relation on the bottle.

The body portion 10 of the tool may comprise a generally flat plate-like member which may be formed of metal or plastic, or fiberglass, etc., and which also is preferably provided with a wear element 26 on its underside, which is adapted for engagement with the top edge 28 of the neck of the container B, for facilitating the rotary movement of the tool with respect to the container in applying the band-like handle member. Element 26 may be conveniently formed of plastic, such as for instance nylon, and therefore if body 10 is of metal, the bottle will be protected during rotation of the tool.

Depending from the body portion 10 may be a horn 30 which provides for the mounting of the tool on the bottle. As may be best seen in FIG. 8, horn 30 is of a smaller exterior diameter than the interior diameter of the bottle neck, and the laterally projecting portion 30a of the horn is adapted to engage the confronting sloping section of the bottle in the fully mounted condition of the tool on the neck of the bottle, and aid in maintaining the tool body in generally horizontal condition. Horn 30 may be secured to body 10 by fastener 31 (FIG. 1).

Figure 2:
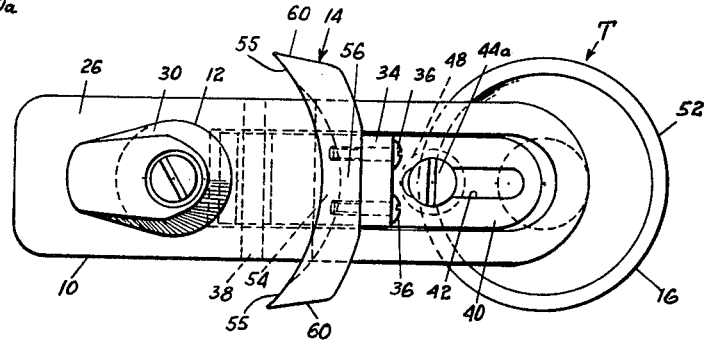
FIG. 2 is a bottom plan view of the tool illustrated in FIG. 1.
Figure 3:
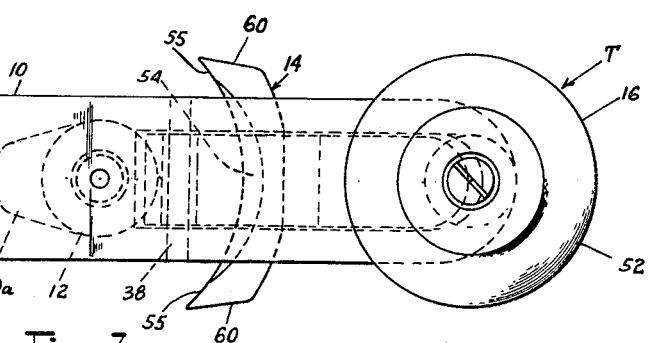
FIG. 3 is a top plan view of the tool illustrated in FIG. 1.

In the embodiment illustrated, there is provided a bracket 32 having a flange portion 34 to which is secured the shoe 14 as by means of screws 36. Bracket 32 is pivoted as at 38 for movement in a generally vertical plane. Projecting rearwardly from flange portion 34 is a shelf portion 40 having an elongated slot 42 therethrough. Projecting downwardly from the body portion 10 and extending through the slot 42 is a stud 44 having a head 44a thereon which is of such size that it cannot pass through slot 42, and as best illustrated in FIG. 2. Extending between the underside of the body portion 10 and the top surface of ledge 40 is a spring member 46 disposed under compression, so that it is continually urging the bracket 32 to pivot in a clockwise direction (as viewed in FIG. 1) about its pivot point 38. Head 44a on stud 44 limits such clockwise pivoting. Stud 44 may be adjustably secured to body 10 and, as by means of threads 47. A washer member 48 may be provided, coacting with the spring 46, for facilitating the movement of the shelf portion 40 with respect to the spring, upon pivoting of bracket 32. It will be understood that as shown in FIG. 1, the bracket 32 has been pivoted counterclockwise against the resistance to compression of spring 46.

Projecting upwardly from body portion 10 may be a boss 50 with a handle knob 52 rotatably secured thereto, as at 52a, which arrangement provides for convenient rotation of the body portion and attached cam shoe 14, when the tool is in mounted condition on the neck of the container or bottle, as will be hereinafter described in detail.

The shoe member 14 which may be formed of plastic, such as nylon, is of generally arcuate configuration on its front surface 54, or in other words the surface disposed in confronting relation with the horn 30. Shoe member 14 is adapted to first force one section of the ring portion 22 of the handle H down over the enlargement 20 of the bottle, and then to cam the remainder of the ring portion beneath the enlargement of the bottle during rotation of the tool on the handle.

Referring now in particular to FIGS. 10 and 11, there is shown on the shoe member 14 illustrated, various radii and dimensions therefor. Preferable numerical values in inches are given in the following list for one embodiment of such shoe member. These dimensions may vary with the size of the container or bottle with which the tool is adapted for use.

| | |
|---|---|
| R1 | 1⅜ |
| R2 | 1⅝ |
| R3 | 3½₃₂ |
| R4 | 1½ |
| R5 | ⅜ |
| A | 2 |
| F | 1⁹⁄₃₂ |
| C | 1¹⁹⁄₃₂ |
| D | ⅝ |
| E | ⁹⁄₁₆ |

As can be seen, R3 defining the upper edge of the surface 54 of the shoe is of a lesser dimension as compared to R1 defining in part the curvature of the lower edge of arcuate surface 54. Accordingly, the shoe possesses outer end surface portions 55 for a purpose to be hereinafter set forth.

When the tool is first inserted in the neck of the bottle on which has been previously mounted a handle H, the bottom surface 56 of the shoe, defined in part by radius R4, or more particularly the central section of such surface, enters the ring-like portion 22 of the handle, and forces it over laterally (FIG. 6) preparatory to downward movement of a section of the ring-like portion 22 over the respective underlying section of the enlargement 20 on the bottle neck.

Further downward movement of the tool horn 30 into the neck of the bottle from the position shown for instance in FIG. 6, causes the surface 56 of the shoe 14 to force the underlying section of the ring portion 22 of the handle, down over the underlying section of the enlargement 20 on the bottle neck. In this connection, dimension A of the shoe is of sufficient extent so that when such section of ring portion 22 is forced beneath bumper 20, it will remain there even though the downward pressure of the tool is removed by lifting up on the tool. In this position of the tool and handle H (FIG. 7) the outer end portions of surface sections 55 of the shoe are in engagement with and generally ride in the outer periphery of the enlargement 20 on the bottle neck, while the remainder of the surface 54 of the shoe is in spaced relationship to the enlargement 20 on the bottle neck. Also the outer end edge portions 58 of the bottom edge of surface 54 of the shoe, engage the top surface 59 of the ring portion 22 of the handle with edges 58 being defined by R5 (FIG. 11). As may be seen from FIGS. 10 and 11, R5 is materially less than either R1 or R4. Also, as best seen in FIG. 4, the shoe is tapered rearwardly as at 60, away from the edge portions 58.

During the downward movement of the tool into the neck of the bottle and the forcing of a section of the band portion 22 over the enlargement 20, it will be seen that the shoe bracket 32 pivots automatically about its pivotal axis 38 and against the resistance to compression of the spring 46, so that the distance between the outer end surface portions 55 of the shoe 14 and the axis of rotation of the tool increases, with the shoe bracket 32 and attached shoe 14 being disposed in the general position illustrated in FIG. 7. In this position, the spring 46 is compressed substantially its maximum amount and offers considerable resistance to any further counterclockwise pivoting of bracket 32. Also, engagement of the bracket 32 with the underside of the body 10, will positively limit further counterclockwise pivoting of the bracket 32 and attached shoe. During movement of the tool from the FIG. 6 to FIG. 7 positions, the counterclockwise pivoting of the shoe 14 causes the latter to slide on its rearwardly tapered surface 56 along the top surface of the ring 22 of the handle while forcing such ring section downwardly over enlargement 20, while at the same time edge portions 58 maintain a generally close sliding contact with the defining surface of the enlargement 20 on the bottle, so that the remainder of the ring portion of the handle is in position to be cammed downwardly by the leading of the edge portions and associated taper 60, upon rotation of the tool.

It will be seen therefore that movement of the tool and handle from the position shown in FIG. 6 to the position shown in FIG. 7 requires only one hand of the operator, the operator's other hand being utilizable for holding the bottle, and that pressure of the operator's hand on knob 52 causes movement of shoe 14 down along section 59' of the bottle neck, resulting in stretching of the ring portion 22 of the handle and movement of a section thereof beneath enlargement 20 on the bottle.

When the tool has forced a section of the ring-like portion 22 of the carrying handle over the underlying section of the enlargement 20 and is in generally horizontal condition on the bottle, then upon rotation of the tool by means of the knob 52 about a generally vertical axis passing through the horn 30 which extends into the neck of the bottle, the leading one of the portions 58 of the lower edge of the shoe rides upon the top surface 59 (FIG. 8) of the ring portion 22 of the handle, and forces or cams the remainder of the ring portion 22 down beneath the enlargement 20 on the neck of the bottle, whereupon the ring portion is in secured relation with the bottle. It will be seen that since the central portion of the surface 54 of the shoe does not engage the ring portion 22 of the handle or the enlargement 20 of the bottle neck when the tool is in the general position illustrated in FIG. 7, and the shoe only engages the enlargement 20 on the bottle neck at its end surfaces 55, which surfaces 55 are defined primarily by R1 which is preferably approximately the same radius of curvature as the maximum radius of curvature of enlargement 20 of the associated bottle, there is only slight frictional resistance to rotation of the tool, whereupon the shoe can readily rotate along the top surface 59 of the ring portion 22 and effectively cam it down beneath the enlargement on the bottle neck.

In order to facilitate the stretching or movement of the ring-like portion 22 of the handle over the bottle neck enlargement 20, heat may be applied to the plastic handles prior to their being applied to the respective bottle neck. This facilitates the application of the handles to the bottle necks by giving a greater elasticity to the band-like portions 22 of the handles. However, such heating is not usually necessary with the tool illustrated.

With the tool of the invention, a considerable number of handles, and as high as 720 or more per hour, can be applied to containers, which is a considerable improvement in the application of this general type of handle to a container neck as compared to heretofore known arrangements.

Referring now to FIGS. 12 through 14, there is illustrated a modified form of tool T'. In this embodiment, there is provided a circular hub portion 70, which may be formed of plastic, for generally close receipt in the circular indentation 72 in the bottle, for aiding in stabilizing and guiding the tool during rotation thereof on the bottle. Hub 70 may be disposed intermediate wear plate 26 and horn 74 for convenient attachment thereof to the body 10 by means of the fastener 31. The projecting portion 74a of the horn may be provided with a generally tapered flat area 76 sloped complementary to the slope of portion 78 of the bottle wall, for aiding in the wearability and stabilization of the tool on the bottle. Also, the horn 74 possesses a greater tapering, as at 80 along its shank, as compared to the horn of the first described arrangement. In other respects, the tool T' may be generally similar to that of the first described embodiment.

From the foregoing discussion and accompanying drawings it will be seen that the invention provides a novel tool for conveniently and readily applying a band, such as an elastomeric or plastic carrying handle, to a container, and one which can be operated by a single operator and can effectively force the handle down into coacting relationship with the bottle.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the invention claimed.

I claim:

1. A tool for applying an expansible band to a container having a peripheral enlargement thereon with the enlargement being spaced downwardly from the open upper end of the container, comprising, a generally horizontally extending body portion, means depending from said body portion, a shoe member pivotally mounted on said body portion in depending relation thereto and in generally spaced relation to the first mentioned means, resilient means coacting between said shoe member and said body portion and urging said shoe member toward said first mentioned means, said first mentioned means being adapted to be received in the upper end of the container and serving as the center of rotation of the tool on the container and for mounting the tool on the container, and said shoe member having cam means thereon adapted to force a section of the band downwardly beneath the enlargement on the container upon mounting of the tool on the container, and having another integral cam means thereon disposed laterally of the first mentioned cam means and adapted to engage the enlargement and the band and cam the remainder of the band beneath the enlargement upon rotation of the tool.

2. A tool in accordance with claim 1 wherein said first mentioned means comprises a horn-shaped member, and means limiting the pivotal movement of said shoe member toward said horn-shaped member.

3. A tool in accordance with claim 1 wherein said shoe member comprises a generally transversely extending arcuate shaped surface disposed in confronting relation to said first mentioned means, said last mentioned surface being symmetrically arranged with respect to the vertical axis of said first mentioned means, said last mentioned surface extending convergingly with respect to said first mentioned means, in a downward direction, said last mentioned surface being of such curvature that the intermediate portion thereof will be spaced from the enlargement when the tool is mounted in operative position on the container.

4. A tool for applying an expansible band to a container of the type including a neck portion having an enlarged circumferentially extending bumper thereon, the band being adapted to be disposed in encircling relation to the neck portion of the container below the bumper and with the band being of a smaller internal diameter size as compared to the external diameter size of said bumper, said tool comprising a generally horizontally extending rigid body portion, a horn portion depending from said body portion, said horn portion being adapted to be received in said container for rotatably mounting the tool on the container, a handle portion projecting upwardly from said body portion in a direction generally opposite to the direction of extension of said horn portion, and a shoe pivoted to said body portion in depending relation thereto, and in longitudinally spaced relation to said horn portion, said shoe having means adapted to force an underlying section of the band downwardly beneath the bumper upon mounting of the tool on the container, and including cam means adapted to ride upon the top of the band and cam the remainder of the band beneath the bumper upon rotation of the tool, said shoe member comprising a generally transversely extending arcuate shaped surface disposed in confronting relation to said first mentioned means, the lower edge of said surface being of arcuate configuration and defining the lower boundary of said shoe member, the lateral end portions of said lower edge comprising said cam means with each of said lateral end portions having a lesser radius of curvature than the portion of said lower edge disposed intermediate said end portions, and means resiliently urging said shoe toward said horn portion.

5. A tool for applying an expansible band to a container having a periphery enlargement thereon, comprising, a body portion, means depending from said body portion, a shoe member pivotally mounted on said body portion in generally spaced relation to the first mentioned means, means urging said shoe member toward said first mentioned means, said first mentioned means being adapted to be received in the container and serving as the center of rotation of the tool on the container, said shoe member having means adapted to force a section of the band downwardly beneath the enlargement on the container upon mounting of the tool on the container, and then to cam the remainder of the band beneath the enlargement upon rotation of the tool, said body portion being comprised of a metallic-like material and a wear plate of plastic material underlying said body portion and in encompassing relation to said first mentioned means, for engagement with the container when the tool is mounted thereon.

6. A tool in accordance with claim 5 which is adapted for use with a container having an upwardly facing cylindrically recessed neck portion, said first mentioned means including a cylindrical hub adapted for receipt in generally close relation in the recessed neck portion for stabilizing and guiding the tool on the container during rotation of the tool.

7. A tool in accordance with claim 6 wherein said first mentioned means comprises a horn-shaped member including a laterally projecting portion, the last mentioned portion having a generally flattened surface section thereon facing in a direction away from said shoe member and adapted for surface-to-surface sliding coaction with the container upon rotation of the tool.

8. A tool for applying an expansible band to a container having a peripheral enlargement thereon comprising, a body portion, means depending from said body portion, a shoe member pivotally mounted on said body portion in generally spaced relation to the first mentioned means, means urging said shoe member towards said first mentioned means, said first mentioned means being adapted to be received in the container and serving as the center of rotation of the tool on the container, said shoe member having means adapted to force a section of the band downwardly beneath the enlargement on the container upon mounting of the tool on the container, and then to cam the remainder of the band beneath the enlargement upon rotation of the tool, said shoe member comprising a generally transversely extending arcuate shaped surface disposed in confronting relation to said first mentioned means, said surface extending convergingly with respect to said first mentioned means in a downward direction, the lower edge of said surface defining the lower boundary of said shoe member and comprising said means on said shoe member, the lateral end portions of said lower edge each having a lesser radius of curvature than the portion of said lower edge disposed intermediate said end portions.

9. A tool for applying an expansible band to a container having a peripheral enlargement thereon, comprising, a body portion, means depending from said body portion, a shoe member pivotally mounted on said body portion in generally spaced relation to the first mentioned means, means urging said shoe member towards said first mentioned means, said first mentioned means being adapted to be received in the container and serving as a center of rotation of the tool on the container, said shoe member having means adapted to force a section of the band downwardly beneath the enlargement on the container upon mounting of the tool on the container, and then to cam the remainder of the band beneath the enlargement upon rotation of the tool, said shoe member comprising a generally transversely extending arcuate shaped surface disposed in confronting relation to said first mentioned means, said surface extending convergingly with respect to said first mentioned means in a downward direction, said shoe member having a bottommost defining surface of generally convex configuration, said convex surface being tapered generally upwardly in a direction away from said first mentioned means, the central section of the shoe member comprising said means thereon which is adapted to force a section of the band downwardly beneath the enlargement on the container.

10. A tool for applying an expansible band to a container having a circular peripheral enlargement thereon, comprising, a body portion, means depending from said body portion, a shoe member pivotally mounted on said body portion in generally spaced relation to the first mentioned means, means urging said shoe member towards said first mentioned means, said first mentioned means being adapted to be received in the container and serving as the center of rotation of the tool on the container, said shoe member having means adapted to force a section of the band downwardly beneath the enlargement on the container upon mounting of the tool on the container, and then to cam the remainder of the band beneath the enlargement upon rotation of the tool, said shoe member comprising a generally transversely extending arcuate shaped surface disposed in confronting relation to said first mentioned means, said surface extending convergingly with respect to said first mentioned means in a downward direction, the radius of curvature of each of the lateral end portions of said surface being greater than the radius of curvature of the remainder of said surface, with said radius of curvature of each of said lateral end portions being substantially the radius of curvature of the enlargement on the container.

11. A tool for applying an expansible band to a container having a peripheral enlargement thereon, comprising, a body portion, means depending from said body portion, a shoe member pivotally mounted on said body portion in generally spaced relation to the first mentioned means, means urging said shoe member towards said first mentioned means, said first mentioned means being adapted to be received in the container and serving as the center of rotation of the tool on the container, said shoe member having means adapted to force a section of the band downwardly beneath the enlargement on the container upon mounting of the tool on the container, and then to cam the remainder of the band beneath the enlargement upon rotation of the tool, said shoe member being pivoted to said body portion by means of a bracket depending from said body portion and pivoted thereto for swinging movement in a generally vertical plane, the second mentioned means comprising a compression spring coacting between said body portion and said bracket, said bracket having a slot therethrough, a stud depending from said body portion and extending through said slot, said stud having means on its free end engageable with the bracket for limiting the pivotal movement of said bracket and attached shoe member toward said first mentioned means.

References Cited by the Examiner

UNITED STATES PATENTS

| | | | |
|---|---|---|---|
| 460,256 | 9/91 | Steward | 145—66 |
| 751,496 | 2/04 | Gode | 145—66 |
| 1,968,640 | 7/34 | Elms | 29—235 |
| 2,421,856 | 6/47 | Teegarden | 157—1.21 |
| 3,036,371 | 5/62 | Gray | 29—235 |

WILLIAM FELDMAN, *Primary Examiner.*